(12) United States Patent
Brower

(10) Patent No.: US 8,127,801 B2
(45) Date of Patent: Mar. 6, 2012

(54) ADVANCE INSTRUMENTATION METHODS FOR PIPES AND CONDUITS TRANSPORTING CRYOGENIC MATERIALS

(76) Inventor: David V. Brower, Houston, TX (US)

( * ) Notice: Subject to any disclaimer, the term of this patent is extended or adjusted under 35 U.S.C. 154(b) by 903 days.

(21) Appl. No.: 12/150,425

(22) Filed: Apr. 28, 2008

(65) Prior Publication Data

US 2009/0077982 A1    Mar. 26, 2009

Related U.S. Application Data

(60) Provisional application No. 60/914,756, filed on Apr. 29, 2007.

(51) Int. Cl.
  *F16L 9/14* (2006.01)
  *F25J 5/00* (2006.01)
(52) U.S. Cl. ........ 138/149; 138/109; 138/148; 138/114; 138/113; 285/47; 285/124.2
(58) Field of Classification Search .......... 138/112–114, 138/148, 149, 109; 285/47, 138, 149, 124.2; 62/55

See application file for complete search history.

(56) References Cited

U.S. PATENT DOCUMENTS

| | | | | |
|---|---|---|---|---|
| 3,865,145 A * | 2/1975 | McKay et al. | ................ | 138/113 |
| 3,882,382 A * | 5/1975 | Johnson | ........................ | 324/694 |
| 4,162,093 A * | 7/1979 | Sigmund | ......................... | 285/47 |
| 4,219,224 A * | 8/1980 | Hanley | ............................. | 285/47 |
| 4,219,225 A * | 8/1980 | Sigmund | ......................... | 285/47 |
| 4,415,184 A * | 11/1983 | Stephenson et al. | ............ | 285/47 |
| 4,640,312 A * | 2/1987 | Patell et al. | ................... | 138/109 |
| 4,718,459 A * | 1/1988 | Adorjan | ........................ | 405/172 |
| 6,753,520 B2 * | 6/2004 | Spirin et al. | ............. | 250/227.16 |
| 6,876,786 B2 * | 4/2005 | Chliaguine et al. | ............. | 385/13 |
| 2005/0155663 A1 * | 7/2005 | Dhellemmes et al. | ........ | 138/149 |
| 2008/0296890 A1 * | 12/2008 | Prescott et al. | ................ | 285/47 |

* cited by examiner

Primary Examiner — Patrick F Brinson

(57) ABSTRACT

A cryogenic material transfer system incorporates a pipe-in-pipe configuration with a nanoporous or microporous insulating layer filling the annulus between the inner and outer pipe. The insulating layer is of sufficient flexibility to absorb and expansion or contraction of the inner pipe due to the flow of cryogenic material therethrough. For longer transfer systems a bulkhead is provided between adjacent pipe joints. Intermediately of the pipe joints an additional bulkhead may be employed to provide additional sealing or water stops and for providing provide additional load transfer. A fiber optic sensor system is installed in the annuals between the inner and outer pipe.

30 Claims, 6 Drawing Sheets

ADVANCE INSTRUMENTATION METHODS FOR PIPES AND CONDUITS TRANSPORTING CRYOGENIC MATERIALS

CROSS REFERENCE TO RELATED APPLICATION

This application is based on and claims priority under U.S. Provisional Application No. 60/914,756, which was filed by David V. Brower, the inventor of the subject invention, on Apr. 29, 2007, and which is incorporated herein by reference.

BACKGROUND OF THE INVENTION

1. Field of the Invention

The invention is generally related to instrumentation methods for monitoring and measuring fatigue in pipes or conduits for carrying cryogenic materials and is specifically directed to a pipeline system including fiber optic sensor instrumentation systems and methods.

2. Discussion of the Prior Art

Pipeline transfer of cryogenic fuels and other liquids such as liquid natural gas (LNG) is commonplace throughout the world. In fact, LNG is currently the fastest growing hydrocarbon fuel in the world. While gas as a primary fuel source is forecast to grow at 3% in the coming two decades, LNG is forecast to grow at double that rate over the same period. This growth will result in the need for additional facilities for the production and transportation of LNG in the foreseeable future, and as a result new technologies will emerge to address cost, safety and reliability issues that this expansion may create.

For example, LNG loading into the tankers and the offloading thereof, require the use of terminals designed to handle the LNG. Terminals at the loading site are normally close to the liquification plant and traditionally on the offloading end, and the terminal is typically situated near a storage facility and re-gasification plant. Proximity of the onshore terminals to water access has prompted a review of increased shipping traffic in congested waterways. As terminal siting concerns build over pressures from environmental and public safety issues, there is a trend to reconsider moving terminal locations offshore.

Given that both production and import of LNG will move more and more offshore, there is a growing need for a safe, efficient and reliable transfer system. Beginning in the 1970's, a sub sea LPG pipeline was designed for a Middle Eastern LPG terminal. This continued into the 1980's with the first sub sea LNG pipeline for an arctic LNG ship system in Alaska.

Terminals are required for both the loading of LNG into the tankers and for offloading thereof. For locations with sufficient deep water access close to the coast, terminals may consist of jetty structures and breakwaters, where tankers can be moored and offloading can take place via the standard loading arms.

When conditions are less favorable due to shallow waters, congested shipping and/or mooring situations, or because of lack of community acceptance and permitting difficulties, offshore terminals are a very attractive alternative. Although such terminals exist—they have been widely used for loading of crude oil and oil products for many years—no offshore terminals for LNG are in use.

The most dominant advantages of LNG offshore terminals are the lower costs for construction and operation, the possibility to locate the terminal in deeper water thereby eliminating the need for dredging and increased availability, safety and reduced voyage time as LNG carriers need not enter and maneuver in congested waters. LNG carrier berths can be located away from confined waterways, thereby increasing both safety and also security, while at the same time reducing costly civil works. Furthermore, impairment of other new and existing shipping traffic will be minimized.

A sub sea pipeline can be used to transport the LNG from/to an offshore terminal, thereby eliminating the need and cost for a connecting trestle. With current sub sea cryogenic pipeline designs, LNG can be efficiently transferred over distances of up to 20 miles.

Current pipeline technologies for cryogenic products, such as LNG, use both flexible hoses and rigid pipe. The former is limited to short-distance loading and offloading hoses because of the high expense and the limitation of insulation that can be provided. For longer distance pipelines, rigid pipelines must be used. Current configurations and methods for rigid cryogenic pipelines typically involve the use of low pressure or vacuum environments in an insulating space around a product pipeline to achieve the desired thermal performance characteristics. While low pressure or vacuum systems often provide relatively good insulation, operation and maintenance of such systems tends to be costly, and frequently becomes problematic where such pipelines are submerged on, or even below the sea bed.

Other difficulties are also often encountered, most typically associated with thermal expansion/contraction due to cooling, compression and/or structural stability. For example, one current technology accommodates the contraction by the use of INVAR (36% Nickel Steel), which has very low expansion and contraction properties. In such a configuration, the INVAR steel product transportation line is contained within an external steel casing pipeline with a partial vacuum on the insulated annulus. While thermal expansion is almost completely avoided, various disadvantages nevertheless remain. For example INVAR steel is relatively expensive and often cost prohibitive. Moreover, generation and maintenance of the low pressure (e.g., 100 mbar) in the pipeline assembly requires considerable energy and cost over the life of the pipeline.

In other known configurations, contraction and expansion capabilities are improved with the use of bellows. This configuration incorporates the use of bellows, one in each segment (about 50 ft long) of the pipeline, which is a self-contained pipe-in-pipe segment, and uses vacuum insulation. However, the use of bellows along the length of pipeline typically increases production costs, and typically complicates manufacture, handling and maintenance. The bellows methods are generally more costly than the INVAR™ system. The bellows method has significant disadvantages in reliability and durability, both with the bellows and with the maintenance of vacuum. For a sub sea application, reliability and durability are even more critical.

SUMMARY OF THE INVENTION

The subject invention is directed to pipelines for transporting material at sub-ambient temperature and especially cryogenic material constructed in a manner such that the pipeline has both increased mechanical stability and desirable thermal insulation properties while maintaining a mechanically simple structure. The configurations of the subject invention are relatively inexpensive to manufacture and install. The configurations embody these desired characteristics by the incorporation of a silica aerogel insulation contained in a pipe-in-pipe environment that is designed as a structural element.

The configurations of the subject invention take advantage of recent developments in insulation technology and fiber-optic sensing technology to address the issues that confront long distance sub sea cryogenic pipelines. The pipeline technology of the subject invention addresses the making of these rigid pipelines, and provides a solution which is more cost efficient than either the INVAR™ or the bellows configurations.

In the configurations of the subject invention, a number of bulkheads (non-metallic, hybrid, or metallic) and spacers are employed to create an annular space between the product pipeline and the outer casing pipe, wherein the annular space is partially filled with a high efficiency microporous or nanoporous insulating material. The bulkheads are configured (and coupled to the inner and outer pipeline) such that the bulkheads transfer the contraction induced axial compression load on the inner cryogenic product pipeline(s) to the outer jacket pipeline. In most cases, the pressure in the annular space will be ambient pressure.

The system functions as a structural column, with thermal insulation maintained in the annular space in an ambient pressure environment, thereby eliminating the need for expensive alloys, vacuum generation and maintenance, or use of expansion bellows. More particularly, the bulkheads that connect the inner and outer pipelines at the ends of the pipeline balance compression forces with the rigidity of the outer pipeline. In such configurations, contraction forces are transferred to the external pipeline, which is thereby compressed.

To prevent buckling, spacers (e.g., thermally isolating) are placed around the inner product pipeline for maintaining a predetermined distance between the pipes, while further cryogenic insulation material (e.g., nanoporous or microporous material) is placed around the remaining surface of the product pipeline. Additionally, these pipeline configurations advantageously allow use of 9% nickel steel for the product pipeline to reduce cost of manufacture. Several grades of stainless steel have been evaluated for the configurations of the subject invention, and depending upon the service requirements and pipeline configuration, it has been determined that the following materials would be suitable for use in the configuration:

Type 316 stainless steel (ASTM A3 12)
9Ni Steel (ASTM 333 Grade 8 pipe)

Other materials will be effective as well, depending on specific application.

Further mechanical stability may be imparted by placing the pipe-in-pipe assembly in a restraining environment. For example, pipelines may be placed in a trench with select back-fill material installed over the pipeline. Therefore, in such configurations, the load on the bulkheads and outer pipeline is transferred into the surrounding soil. Similarly, the pipelines can also be constrained above ground. For example, the pipeline may be placed on a foundation of sleepers that contain sliding or gimbaled supports.

It is generally preferred that two bulkheads cooperate to seal the annular space between the bulkheads. In this configuration, it is typically preferred that the annular space is kept at ambient pressure. However, there may be an advantage to keep the annular space at a slightly higher pressure than ambient when incorporating a leak detection system into the overall design. In this case, any change in annular pressure results in a detection of a leak, either external or internal.

Particularly preferred materials for an LNG product pipeline comprises 9% nickel steel, while the outer pipeline comprises carbon steel. The preferred thermal insulation comprises a high performance nanoporous aerogel product in blanket or bead form installed within the annular space, typically at ambient pressure. Such aerogels may be applied in any form; however, preferred forms include flexible sheets, or spray-coated materials.

While the disclosed cryogenic pipeline configurations and methods are preferably employed for LNG offloading and offshore LNG terminals, numerous alternative uses are also considered suitable. For example, alternative uses could include transfer lines for floating LNG production, storage, and offloading vessels, liquid hydrogen and oxygen fueling lines for aerospace or other applications, and all applications that need to transport cryogenic products through pipelines. Additionally, other uses include LPG transport, or transport of gases and liquids having a temperature below ambient temperature (e.g., liquefied carbon dioxide, LPG, liquid nitrogen, and the like).

Other uses, advantages and feature of the subject invention will be readily apparent from the accompanying drawings and description of the preferred embodiments.

DETAILED DESCRIPTION OF THE PREFERRED EMBODIMENTS

Figure 1:
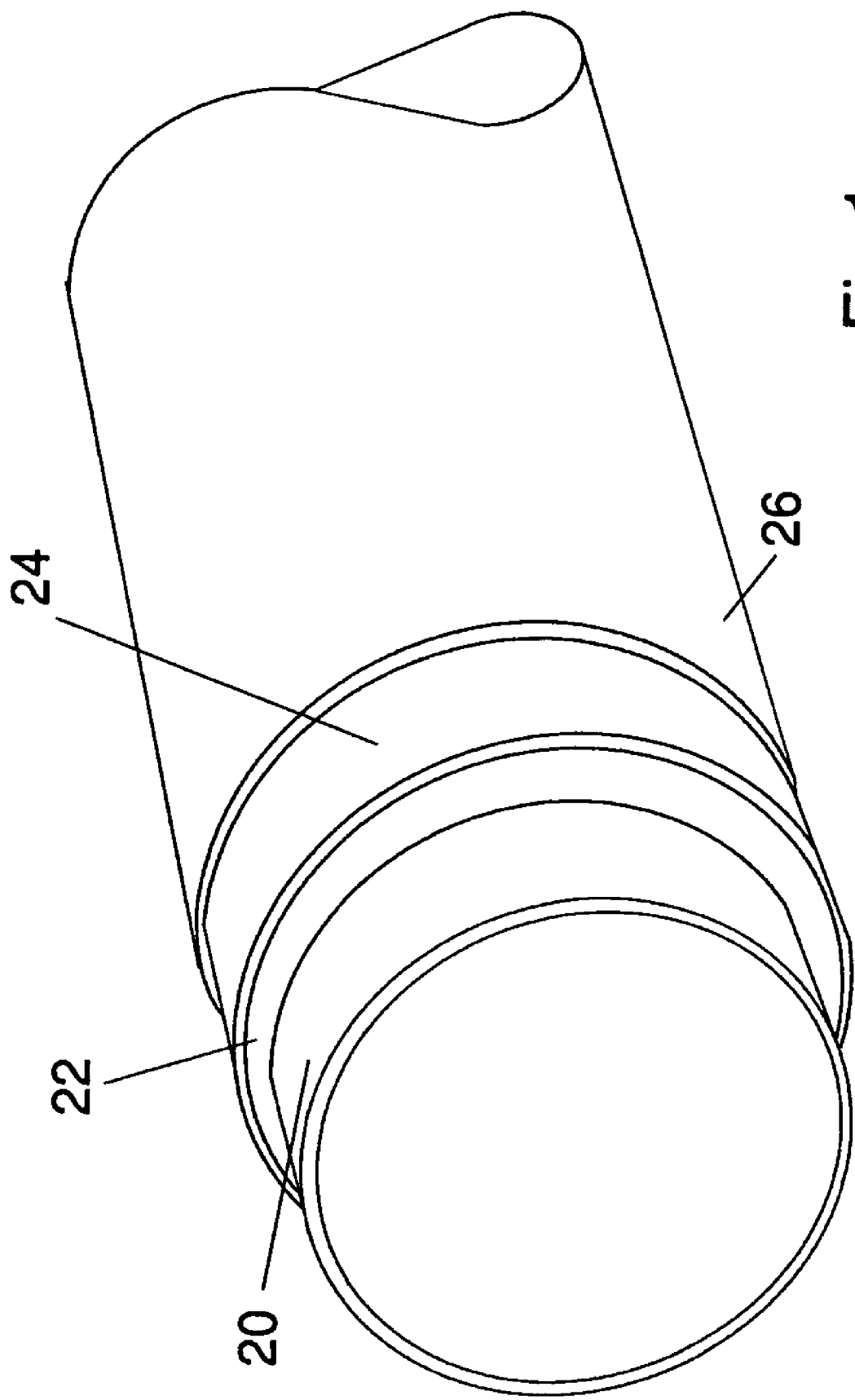
FIG. 1 is a perspective view of the insulated cryogenic pipeline configuration of the subject invention.

The subject pipeline technology uses a highly efficient thermal nanoporous insulation in the annular space between the inner and outer pipes and this material is generally kept in an ambient pressure environment as a result of the space being sealed by bulkheads so this environment is maintained. Where leak detection is employed, the pressure will be slightly above ambient pressure. As shown in FIG. 1, the internal cryogenic product pipe for LNG vapor or LPG service is a rigid pipe such as, by way of example the ASTM 333 Grade 8, 9% nickel steel pipe 20. This is surrounded by a nanoporous insulation material 22 which fill the space between the external casing pipe 24, which may be a carbon steel pipe with FBE corrosion coating, and the internal pipe 20. The insulation is typically a flexible aerogel. There is no need for a water stop commonly required in common insulation systems, as the aerogel insulation is contained within a Tyvek™ or similar outer wrapping and the aerogel is by definition hydro-phobic. The inner and outer pipes are connected with non-metallic or metallic bulkheads. An external concrete weight coating 26 or the like may be applied if desired or required in specific installations.

The current practices for cryogenic pipelines involve the use of low pressure or vacuum environments to achieve the thermal performance characteristics of the insulation systems. In contrast, the disclosed LNG pipeline technology improves on this by utilizing the highly efficient insulation 22 in an ambient environment. The nanoporous insulation is hydro-phobic, in that the pore spaces are smaller than water molecules. Therefore, the insulation does not absorb water and the insulation does not degrade in the presence of water or moisture, an important consideration for thermal efficiency and for operational maintenance.

One of the novelties of the new LNG pipeline technology is the application of non-metal bulkheads and spacers, metallic bulkheads or hybrid bulkheads and spacers to cryogenic product pipelines such as those transporting LNG. The resulting pipeline bundle configuration is a structural element, which addresses the thermal contraction and expansion loads without resorting to expansion bellows or ultra-low thermal contraction alloys. The method eliminates the need for both the expensive alloys and the vacuum pipe-in-pipe. The bulkheads transfer the contraction induced axial compression load on the inner cryogenic carrier pipe(s) to the external jacket pipe. The pipe(s)-in-pipe system functions as a structural column, with thermal insulation maintained in the annular space in an ambient pressure environment.

Figure 2:
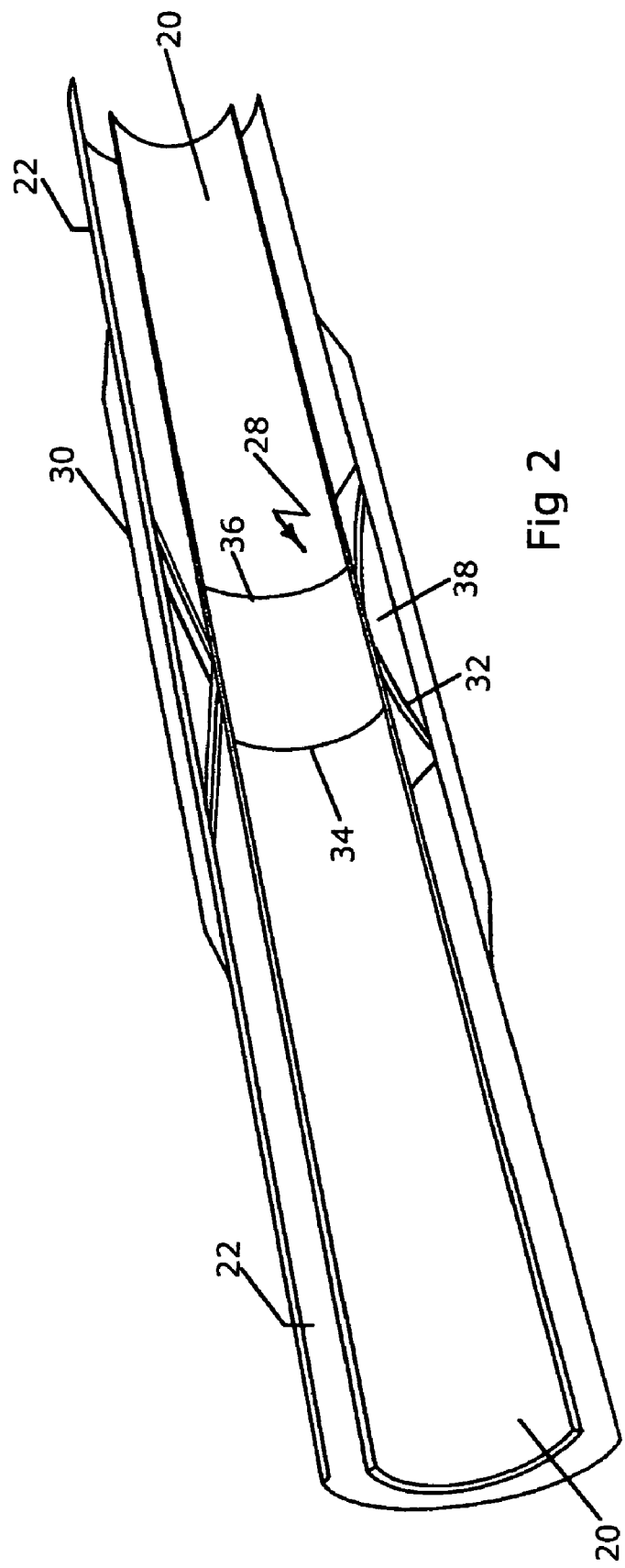
FIG. 2 is a cutaway view of a metallic bulk head at a field joint.

Metallic bulkheads are used at the ends to effect sealing of the annular space and to allow transfer of the contraction inducted axial compression load, see FIG. 2. As there shown, the bulkhead consists of a pipe-in-pipe joint 28. A prefab transition 32 is provided for receiving the two pipe ends 34, 36. A split sleeve 38 is positioned between the two pipe ends 34, 36 and held in position by the prefab transition 32. External insulation 30 may be applied at the joint where required.

Figure 3:
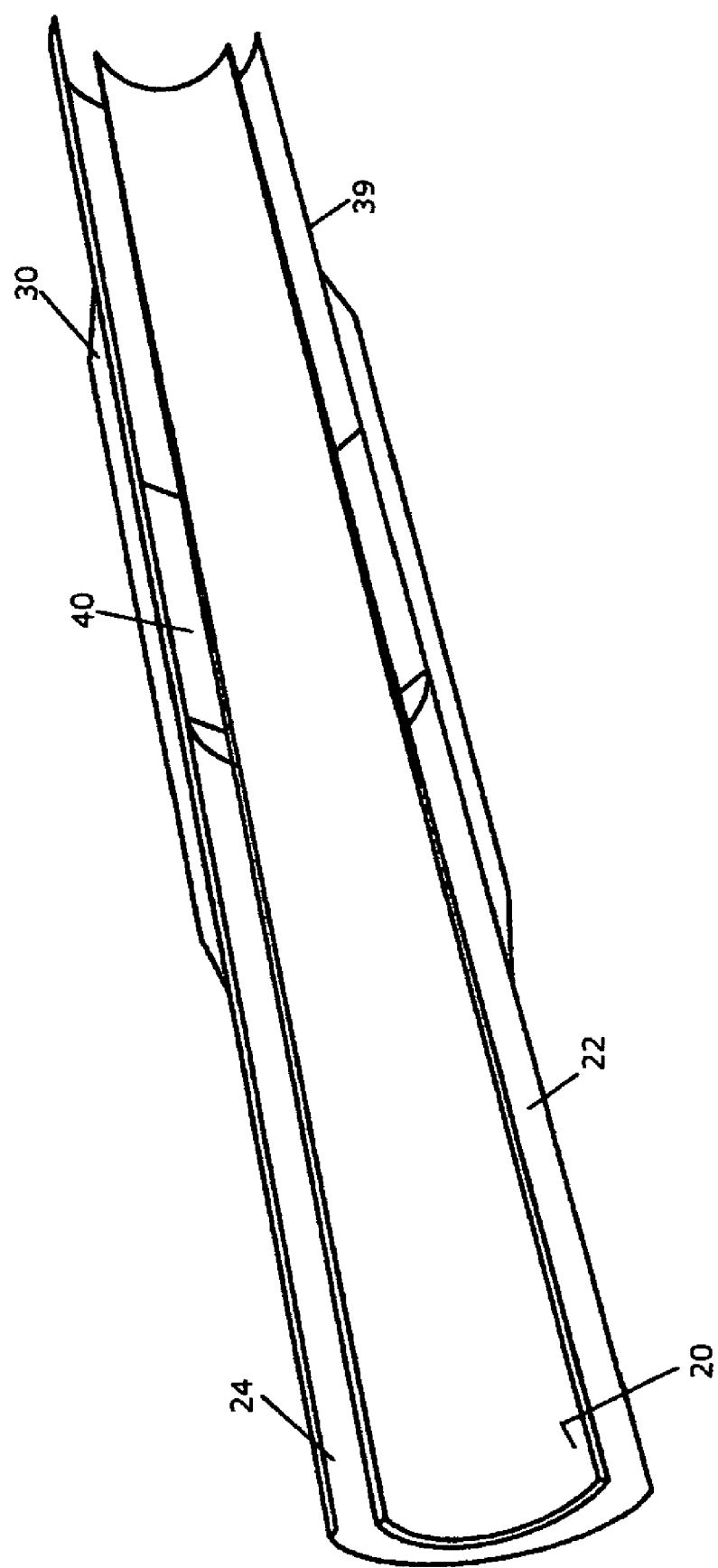
FIG. 3 is a cutaway view of a non-metallic bulkhead.

As shown in FIG. 3, non-metallic bulkheads 40 are used throughout the pipeline configuration to provide additional sealing or water stops and to provide additional load transfer. These non-metallic bulkheads are used to transfer thermal contraction and growth loads from the inner pipe to the outer pipe.

Figure 4:
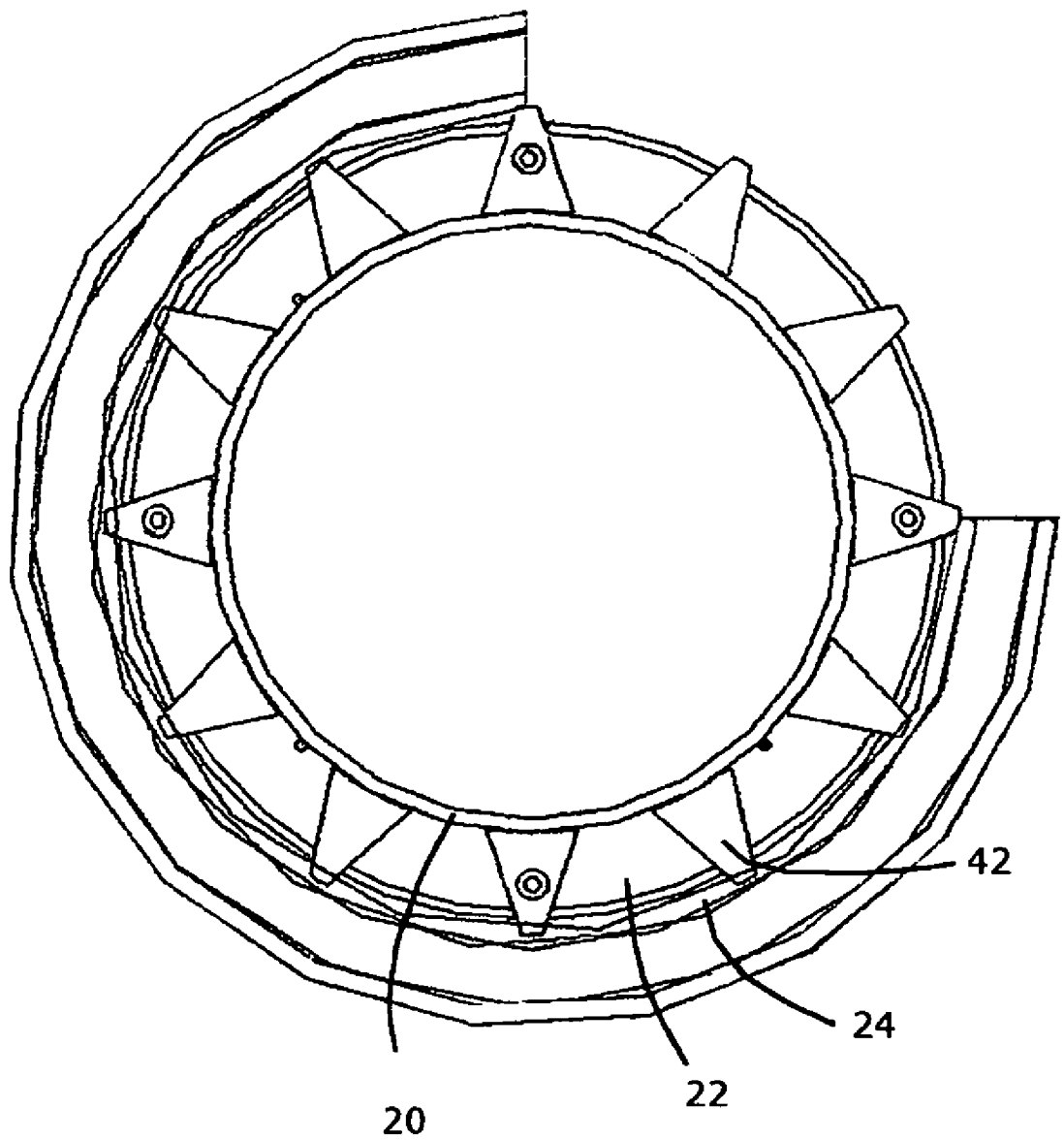
FIG. 4 is a cross-section of the assembly, showing the spacers.

As shown in FIG. 4, spacers 42 are also installed in the annular space between the internal and external pipe to transfer loads by friction and/or shear. The spacers may be of either a metallic or non metallic construction, preferably a polymer or metal capable of absorbing the thermal loads created by the difference in temperature of the inner pipe and outer pipe. Preferably a water stop is incorporated in the design. This may be an integral feature of the bulkheads. External insulation 30 may be provided at the joint when required. The spacers are positioned axially along the length of the pipes between the bulkheads. This not only provides additional support and structural rigidity but also facilitates fabrication.

By way of example, a LNG carrier pipe that would be rated for cryogenic service and the transfer thermal loads imparted through the bulkheads would be a 9% Nickel steel, while the jacket pipe is carbon steel, and the thermal insulation is a high performance nanoporous aerogel product in blanket or bead form installed within the annular space without vacuum and under ambient pressure.

The new LNG pipeline configuration improves the current technology in three areas: Reduction of pipeline cost, increased pipeline reliability, and reduction in maintenance requirements.

Figure 5:
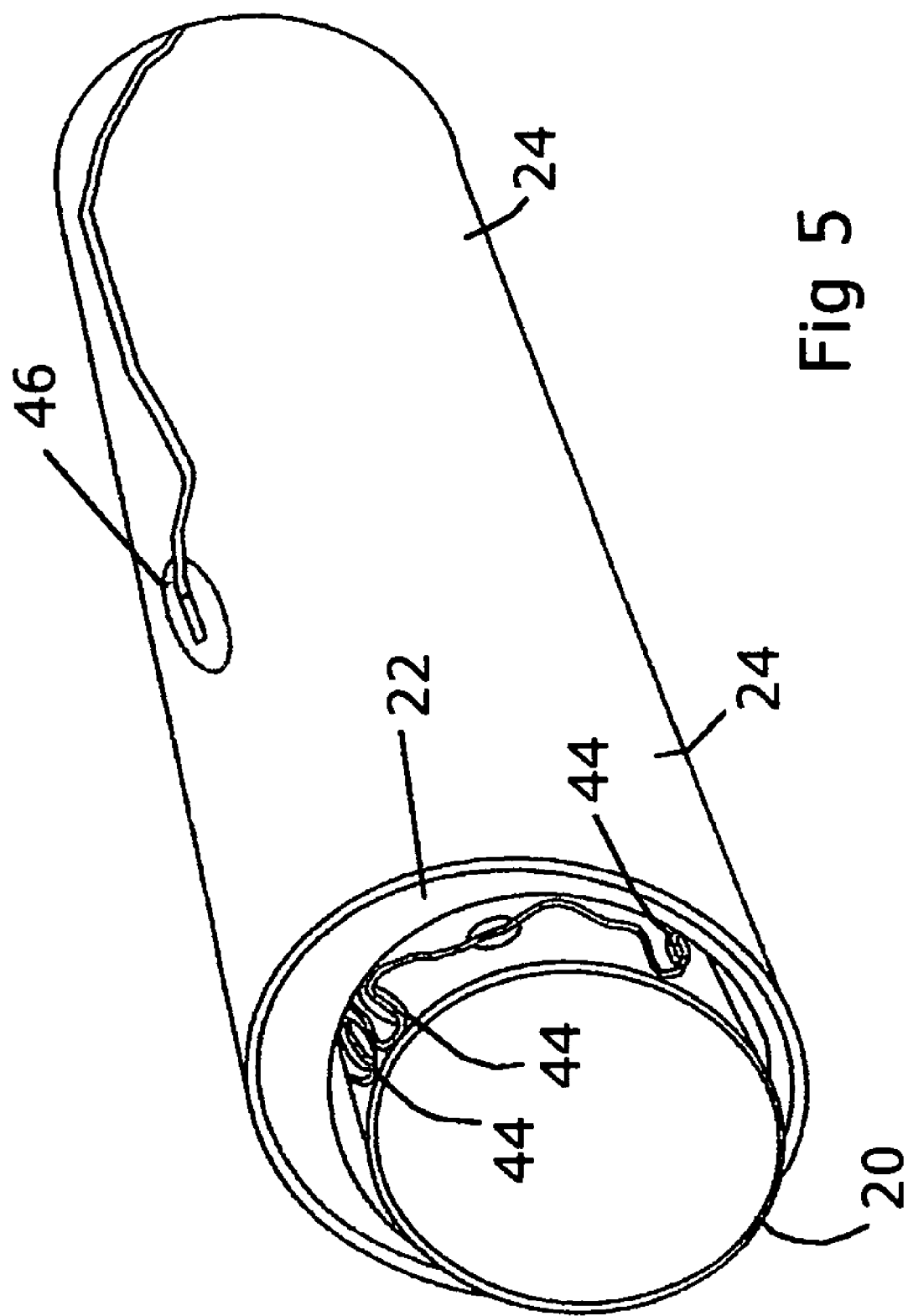
FIG. 5 is similar to FIG. 1, with a fiber optic sensor system installed in the annulus between the internal pipe and the external casing.

As shown in FIG. 5, consideration has been given in the design to a system to monitor the pressures and temperatures within the cryogenic carrier pipe and in the annular space to monitor the efficiency of the thermal insulation and to monitor and detect for internal leaks or for external internal interference from a security point of view. In the preferred embodiment, a fiber-optic real-time monitoring system has been developed that provides a means during operation and maintenance to monitor the sub sea cryogenic pipeline. As shown in FIG. 5 the fiber optic sensor system 44 In the annulus between the inner pipe 22 and the outer casing 24, preferably installed on the external wall of internal pipe 20. The sensor system 44 provides a means for monitoring heat-flux, temperature, pressure and strain on the internal pipe. A coupler 46 is attached to the outer pipe or casing 24 for receiving the inputs from the fiber optic sensors 44 and transmitting them to a collecting and/or monitoring station (not shown).

Installation of pre-fabricated and assembled pipelines can be done by numerous known methods, and especially include the towed method of installation. Alternatively, the pipeline may also be installed by a surface barge. The final method of installation would depend upon the final configuration of the pipeline and the resultant weight for the specific site application.

The pipeline's internal diameter is sized to handle the flow requirements for discharging the LNG tankers within the time frame required. Pipeline wall thickness is normally chosen with a Diameter/Thickness ratio under 50 for construction. All thicknesses used are intended to allow the pipeline to be operated at the low pressures expected.

If a longer tie-back to an onshore site is required, it is possible to extend the maximum length beyond 10 miles by changing the LNG product from a low pressure flow to a higher dense phase pressure flow that keeps the LNG within a range to minimize vapor boil off. This configuration requires an increase in the product transfer pipeline wall thickness and a subsequent change in the overall design, with a corresponding reduction in insulation requirements.

The key to the selection of a sub sea cryogenic pipeline configuration is the consideration given to how the pipeline section can be fabricated and installed for the particular application, as each line must be designed for a site specific application. The pipe-in-pipe configuration chosen is similar to the bundled pipeline configurations that have been installed through-out the world over the last 20-years, so the construction techniques used are familiar to the marine construction industry. These techniques were pioneered in the Gulf of Mexico and North Sea.

Monitoring instrumentation is a key element in the present overall LNG pipeline configuration to address the issues of safety and security in the transport of cryogenic materials in a sub sea environment. Fiber optic sensors provide real-time strain, temperature, vibration, and flow monitoring for sub sea LNG pipelines. Fiber optic sensors are attractive in these applications because of their multiplexing capability, immunity to electromagnetic interference, ruggedness and long distance signal transmission ability.

Key features of fiber optic sensor are listed below:
Are lightweight and small in size.
Are rugged and have a long life-sensors will last indefinitely.
Are inert and corrosion resistant.
Have little impact or no impact on the physical structure.
Can be embedded or bonded to the exterior.
Have compact electronics and support hardware.
Can be easily multiplexed, significantly reducing cost and top side control room power and space.
Have high sensitivity.
Are multifunctional—they can measure strain, temperature, pressure, and vibration.
Require no electric current and are immune to electromagnetic interference (EMI).
Are safe to install and operate around explosives or flammable materials.

Figure 6:
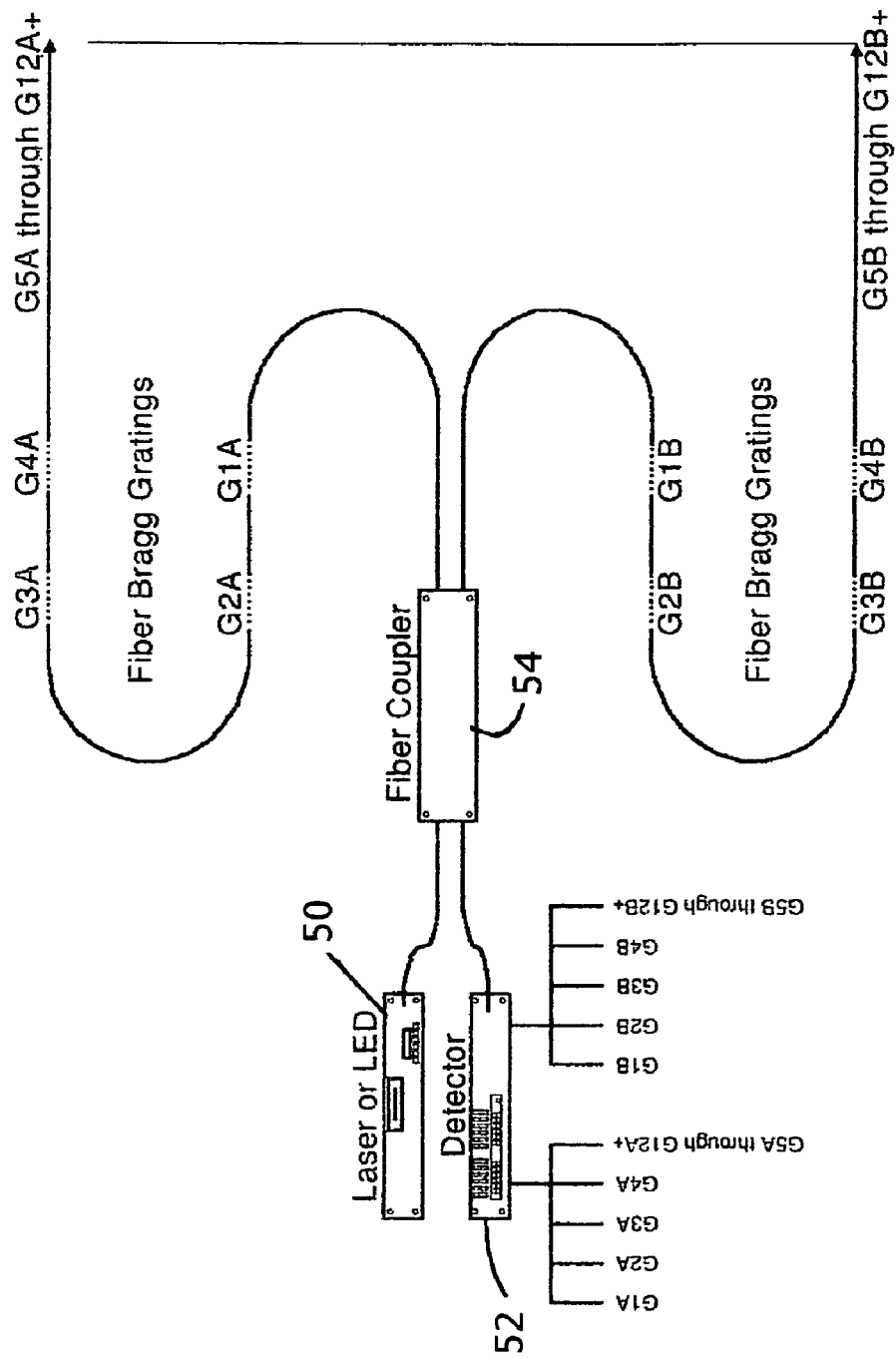
FIG. 6 is an overview of a typical fiber optics instrumentation method as used in accordance with the subject invention.

An overview of typical fiber optics instrumentation method is shown in FIG. 6. As there shown, multiple Laser or LED detectors 50, 52 are coupled via a fiber coupler 54 with the "A" set of gratings passing through a first fiber optic cable and the "B" set of gratings passing through a second fiber optic cable. The number of detectors, gratings and grating sets and cables is arbitrary, and in the example is consistent with the Fiber Bragg Gratings methodology.

The new LNG pipeline configuration improves the existing technology in three areas: (1) Reduction in pipeline cost, (2) increase in pipeline reliability and (3) reduction of maintenance requirements. The first is the advantage against the current technology of using alloys with ultra-low thermal expansion coefficients. All three advantages apply to the current technology of using bellowed pipeline segments.

What is claimed is:

1. A cryogenic material transfer system, comprising:
    a. a plurality of rigid outer pipe pipes each of predetermined length and in end-to-end relationship;
    b. a plurality of rigid inner pipes inside the outer pipes and each of a predetermined length substantially the same as the predetermined length of the corresponding rigid outer pipe;
    c. a bulkhead between and providing a coupling for adjacent ends of pipe lengths;
    d. a transition for receiving two adjacent pipe ends at the bulkhead;
    e. a split sleeve positioned between the two pipe ends and held in position by the transition; and
    f. an insulating layer filling the annulus between the inner and outer pipe of sufficient flexibility to absorb and expansion or contraction of the inner pipe due to the flow of cryogenic material therethrough.

2. The cryogenic material transfer system of claim 1, further including spacers positioned in the annulus between outer pipe and the inner pipe.

3. The cryogenic material transfer system of claim 1, wherein the insulating layer is a nanoporous material.

4. The cryogenic material transfer system of claim 1, wherein the insulating layer is a microporous material.

5. The cryogenic transfer system of claim 1, wherein the bulk head is metallic.

6. The cryogenic transfer system of claim 1, further including an insulator surrounding and external of the bulkhead.

7. The cryogenic transfer system of claim 1, wherein the bulkhead further includes external insulation applied at the joint between the two adjacent pipe ends.

8. The cryogenic transfer system of claim 1, wherein the bulkhead is non-metallic for providing additional sealing or water stops and for providing provide additional load transfer.

9. The cryogenic transfer system of claim 8, wherein the non-metallic bulkhead is further configured for transferring thermal contraction and growth loads from the inner pipe to the outer pipe.

10. The cryogenic transfer system of claim 9, wherein the non-metallic bulkhead further includes a material in the annular space between the internal and external pipe to transfer loads by friction and/or shear.

11. The cryogenic transfer system of claim 1, further a fiber optic sensor system installed in the annulus between the inner and outer pipe.

12. The cryogenic transfer system of claim 11, wherein the fiber optic sensor system includes detectors in direct contact with the external wall of the inner pipe.

13. The cryogenic transfer system of claim 12, wherein the detectors are LED detectors.

14. The cryogenic system of claim 13, wherein the detectors are laser detectors.

15. The cryogenic system of claim 12, wherein the detectors are a combination of LED detectors and laser detectors.

16. The cryogenic system of claim 12, including a fiber optic coupler for combining the outputs from the detectors.

17. The cryogenic system of claim 12, including a pathway for transmitting the data carried by the fiber-optic system to a location external of the outer pipe.

18. The cryogenic system of claim 12, wherein the fiber optic sensor system is in a Fiber Bragg Gratings configuration.

19. A cryogenic material transfer system, comprising:
    a. a plurality of rigid outer pipes each of predetermined length and in end-to-end relationship;
    b. a plurality of rigid inner pipes inside the outer pipes and each of a predetermined length substantially the same as the predetermined length of the corresponding rigid outer pipe;
    c. a bulkhead between and providing a coupling for adjacent ends of pipe lengths;
    d. a transition for receiving two adjacent pipe ends at the bulkhead;
    e. a split sleeve positioned between the two pipe ends and held in position by the transition;
    f. an insulating layer filling the annulus between the inner and outer pipe of sufficient flexibility to absorb and expansion or contraction of the inner pipe due to the flow of cryogenic material therethrough; and
    g. a fiber optic sensor system installed in the annulus between the inner and outer pipe.

20. The cryogenic transfer system of claim 19, wherein the fiber optic sensor system includes detectors in direct contact with the external wall of the inner pipe.

21. The cryogenic transfer system of claim 20, wherein the detectors are LED detectors.

22. The cryogenic system of claim 21, wherein the detectors are laser detectors.

23. The cryogenic system of claim 21, wherein the detectors are a combination of LED detectors and laser detectors.

24. The cryogenic system of claim 21, including a fiber optic coupler for combining the outputs from the detectors.

25. The cryogenic system of claim 21, including a pathway for transmitting the data carried by the fiber-optic system to a location external of the outer pipe.

26. The cryogenic system of claim 21, wherein the fiber optic sensor system is in a Fiber Bragg Gratings configuration.

27. The cryogenic transfer system of claim 20, wherein the bulk head is metallic.

28. The cryogenic transfer system of claim 19, wherein the bulkhead is non-metallic.

29. The cryogenic transfer system of claim 28, wherein the non-metallic bulkhead is further configured for transferring thermal contraction and growth loads from the inner pipe to the outer pipe.

30. The cryogenic transfer system of claim 28, wherein the non-metallic bulkhead further includes a material in the annular space between the internal and external pipe to transfer loads by friction and/or shear.

* * * * *